US009638419B2

(12) United States Patent
Brunhuber et al.

(10) Patent No.: US 9,638,419 B2
(45) Date of Patent: May 2, 2017

(54) HIGH-TEMPERATURE BATTERY INTEGRATED INTO A STEAM POWER STATION

(71) Applicant: Siemens Aktiengesellschaft, Munich (DE)

(72) Inventors: Christian Brunhuber, Auerbach (DE); Carsten Graeber, Erlangen (DE); Gerhard Zimmermann, Hochstadt/Aisch (DE)

(73) Assignee: Siemens Aktiengesellschaft, Munich (DE)

( * ) Notice: Subject to any disclaimer, the term of this patent is extended or adjusted under 35 U.S.C. 154(b) by 408 days.

(21) Appl. No.: 14/383,560

(22) PCT Filed: Mar. 13, 2013

(86) PCT No.: PCT/EP2013/055151
§ 371 (c)(1),
(2) Date: Sep. 7, 2014

(87) PCT Pub. No.: WO2013/135772
PCT Pub. Date: Sep. 19, 2013

(65) Prior Publication Data
US 2015/0111160 A1    Apr. 23, 2015

(30) Foreign Application Priority Data
Mar. 16, 2012    (DE) .................. 10 2012 204 210

(51) Int. Cl.
*F23L 15/04*    (2006.01)
*H01M 12/08*    (2006.01)
(Continued)

(52) U.S. Cl.
CPC ......... *F23L 15/04* (2013.01); *H01M 8/04022* (2013.01); *H01M 10/5006* (2013.01);
(Continued)

(58) Field of Classification Search
CPC ... F23L 15/04; H01M 8/04022; H01M 12/08; H01M 10/5006; H01M 2300/0074;
(Continued)

(56) References Cited

U.S. PATENT DOCUMENTS 2,806,192 A * 9/1957 Bristol .................. G05D 27/02
236/14
4,425,763 A * 1/1984 Porta et al. .............. B61C 1/02
105/234
(Continued)

FOREIGN PATENT DOCUMENTS

CN    1333577 A    1/2002
DE    19547520 A1    6/1997
(Continued)

OTHER PUBLICATIONS

JP Notice of Allowance dated Sep. 6, 2016, for JP application No. 2014-561438.

*Primary Examiner* — Hoang Nguyen
(74) *Attorney, Agent, or Firm* — Beusse Wolter Sanks & Maire

(57) ABSTRACT

A steam power station is provided having a steam boiler which can be fired by a combustion device in a combustion chamber and has an air preheater which is suitable for removing thermal energy from the flue gas of the combustion chamber in order to transfer the thermal energy to a first air flow, the first air flow being fed back to the combustion chamber at least partly as combustion air. The steam power station also has a high-temperature battery which can likewise be supplied with air from the first air flow.

19 Claims, 3 Drawing Sheets

(51) Int. Cl.
*H01M 10/615* (2014.01)
*H01M 8/04014* (2016.01)

(52) U.S. Cl.
CPC ........ *H01M 12/08* (2013.01); *H01M 2220/10* (2013.01); *H01M 2250/10* (2013.01); *H01M 2300/0074* (2013.01); *Y02B 90/14* (2013.01); *Y02E 60/128* (2013.01)

(58) Field of Classification Search
CPC .......... H01M 2250/10; H01M 2220/10; Y02E 60/128; Y02B 90/14
USPC ................ 122/1 A, 18.2, 33, DIG. 1, DIG. 2
See application file for complete search history.

(56) References Cited

U.S. PATENT DOCUMENTS

| | | | |
|---|---|---|---|
| 4,589,488 A * | 5/1986 | Schirmer | E21B 43/24 166/257 |
| 4,743,517 A | 5/1988 | Cohen et al. | |
| 8,828,340 B2 * | 9/2014 | Jankura et al. | B01D 53/505 423/210 |
| 2002/0006538 A1 | 1/2002 | Stroehle et al. | |
| 2006/0107587 A1 * | 5/2006 | Bullinger et al. | C10L 9/08 44/629 |
| 2007/0099057 A1 | 5/2007 | Ferrall et al. | |
| 2010/0266908 A1 | 10/2010 | De Graffenried, Sr. | |
| 2011/0148123 A1 | 6/2011 | De Doncker | |
| 2012/0003507 A1 | 1/2012 | Krieg | |
| 2012/0006025 A1 | 1/2012 | Koyama et al. | |
| 2013/0034784 A1 | 2/2013 | Landes et al. | |

FOREIGN PATENT DOCUMENTS

| | | |
|---|---|---|
| DE | 4431156 C2 | 7/1999 |
| DE | 102006050990 A1 | 5/2007 |
| DE | 102008039449 A1 | 3/2010 |
| EP | 0304949 A1 | 3/1989 |
| EP | 0312939 A2 | 4/1989 |
| JP | H11176455 A | 7/1997 |
| JP | 2000111007 | 4/2000 |
| JP | 2000111007 A | 4/2000 |
| JP | 2001006728 A | 1/2001 |
| JP | 2001229961 A | 8/2001 |
| JP | 2004022230 A | 1/2004 |
| JP | 2007123275 | 5/2007 |
| JP | 2008181853 A | 8/2008 |
| JP | 2009187755 A | 8/2009 |
| JP | 2010170819 A | 8/2010 |
| JP | 20101707819 A | 8/2010 |
| JP | 2010223572 | 10/2010 |
| JP | 2010223572 A | 10/2010 |
| WO | 2006081033 A2 | 8/2006 |
| WO | 2010102855 A1 | 9/2010 |
| WO | 2011070006 A1 | 6/2011 |

* cited by examiner

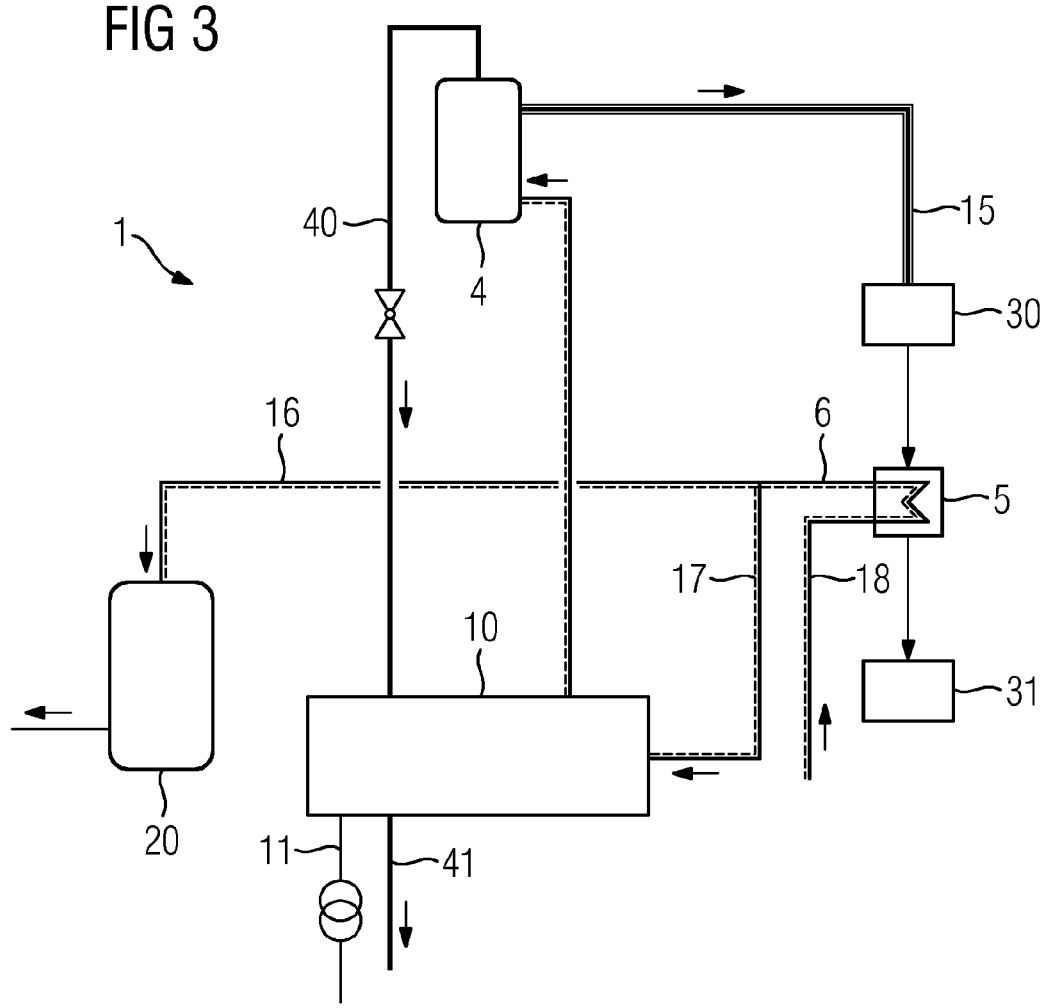

HIGH-TEMPERATURE BATTERY INTEGRATED INTO A STEAM POWER STATION

CROSS REFERENCE TO RELATED APPLICATIONS

This application is the U.S. National Stage of International Application No. PCT/EP2013/055151 filed Mar. 13, 2013, and claims the benefit thereof. The International Application claims the benefit of German Application No. DE 102012204210.5 filed Mar 16, 2012. All of the applications are incorporated by reference herein in their entirety.

FIELD OF INVENTION

The invention relates to a steam power station, comprising a steam boiler, which can be fired by a burner device in a combustion chamber, and also an air preheater, which is suitable for extracting thermal energy from the flue gas of the combustion chamber in order to transfer it to a first air flow, which first air flow is fed again at least in part to the combustion chamber as combustion air. The present invention furthermore relates to a method for operating such a steam power station.

BACKGROUND OF INVENTION

Fossil-fire steam power stations serve primarily for covering the base load in the public electricity supply, that is to say the load of the public electricity network as a result of a power demand which typically does not fall below a specific level on a daily average. Reference is especially made to oil-fired or coal-fired steam power stations as such. For covering further required quantities of electricity, medium power stations or peak power stations are used in the case of corresponding demand.

The steam power stations which are fired with oil or coal are operated as base load power stations on account of the high fixed operating costs and the relatively low fuel costs. During operation, they are operated preferably in the upper load range round the clock, in a manner which is typical to base load. By the same token, depending on technical design, they can also be suitable as medium-load power stations on account of their comparatively advantageous startup speeds or fast controllability.

Since such steam power stations are preferably used in continuous operation, they are especially suitable during times of low electricity demands for feeding into temporary storage systems from which the electric energy can be quickly made available again in the event of renewed electricity demand.

Such temporary storage systems are, for example, industrial electrical batteries which are capable of storing power station capacities of electric energy in electric form. In connection with the provision of electric energy in the public electricity networks, the high-temperature battery technology in particular has proved to be suitable in this case.

Such batteries which are suitable for temporarily storing power station capacities of electric power in order to be able to deliver these capacities in sufficient quantity to the public electricity network again when required, are to be understood as high-temperature batteries in this case. Also, the operating temperatures of these high-temperature batteries is to be at least 100° C., preferably more than 250° C. and most especially preferably more than 500° C. High-temperature batteries are preferably solid-electrolyte batteries with an operating temperature which is referred to above.

Consequently, the sodium-sulfur cell (Na-S-accumulator), for example, is therefore suitable for temporarily storing even larger quantities of electric power. These quantities can be delivered again at very short notice during peak load times or for network stabilization in the public electricity network. A further high-temperature battery technology, which is suitable for the supply at peak load times, is a metal-air battery developed by the applicant, as is described in DE 10 2009 057 720 A1, for example. The contents of this document may be expressly incorporated herewith into this present application by reference. This metal-air battery is distinguished by the presence of an oxidizable material, preferably a metallic material, such as iron, which is oxidized by steam during the discharging of the battery. The power output of the battery is based, moreover, on a cathode-side process gas feed, which typically is supplied with air as process gas. The oxygen present in the air is reduced in this case during a discharging state on the cathode and by means of a gastight solid electrolyte, which separates cathode and anode, is transported into the anode region. Oxidation of the reduced oxygen is carried out there, wherein the released electric charge can be tapped off via contacts as electric power. So that the solid electrolyte can ensure its ionic conductivity in an operating state, the functioning capability of the metal-air battery requires a minimum temperature which cannot be fallen short of for an economical operation.

Common to all high-temperature batteries is that they require supplying with thermal energy for an economical operation. In order to provide this, electric heating systems are typically integrated into the respective batteries as heat sources in order to be able to bring these to operating temperature or to hold these at operating temperature. This, however, often proves to be economically unprofitable in an overall consideration of the electric capacities to be used since the supply with electric energy is distinguished by undesirable power losses during the production, provision and intermediate storage.

Added to these power losses, moreover, are also thermal losses since the operating temperatures of approximately more than 250° C. or of more than 500° C. mean not only a high supply cost for providing the thermal energy which is produced from electric energy but also require a high insulation cost in order to minimize the thermal losses as far as possible.

SUMMARY OF INVENTION

The present invention is consequently based on an object of avoiding the disadvantages which are known from the prior art. It is especially an object of the invention to avoid a relatively inefficient supply of a high-temperature battery by means of thermal energy which is produced directly from electric energy. Also to be proposed is an electricity provision concept which allows an energy-efficient operation of such high-temperature batteries.

Such a concept preferably relates to the integration of a high-temperature battery in a steam power station for the suitable supply of the high-temperature battery with energy.

According to the invention, this object is achieved by a steam power station and also by a method for operating such a steam power station according to the claims.

The object is especially achieved by a steam power station comprised a steam boiler, which can be fired by a burner device of a combustion chamber, and by an air preheater, which is suitable for extracting thermal energy from the flue gas of the combustion chamber in order to transfer it to a first air flow, which first air flow is fed again at least in part to the combustion chamber as combustion air, wherein the steam power station furthermore comprises a high-temperature battery which can also be supplied with air from the first air flow.

An object upon which the invention is based is also achieved by a method for operating such a steam power station, wherein the high-temperature battery in an operating state is especially supplied with air from the first air flow.

According to aspects of the invention, thermal energy is therefore extracted from the flue gas of the combustion chamber and is transferred at least partially to a first air flow, wherein the thermal energy from this first air flow is provided for the supply of the high-temperature battery. Consequently, the thermal energy which is required for the operation of the high-temperature battery is extracted totally or at least partially from the flue gas. As a result, however, electrically operated heating devices in the high-temperature batteries for achieving an operating temperature become superfluous or can be operated with a comparatively lower power output.

The supply of the high-temperature battery, which is integrated into the steam power station process, by means of thermal energy from the first air flow is typically achieved by the extraction of a suitable quantity of air from the first air flow. Therefore, it is more or less conceivable according to the embodiment that the first air flow is divided by provision of suitable air lines, wherein one part of the first air flow is fed again to the combustion chamber as combustion air, but another part is fed in a suitable manner to the high-temperature battery. By suitable fluidic and/or thermal control, moreover, the quantity of thermal energy which is fed to the high-temperature battery can thereby be suitably adjusted.

Furthermore, the arrangement of the high-temperature battery in the power station network proves to be especially advantageous since the thermal or electrical power losses when supplying the high-temperature battery can thereby also be largely minimized. In this respect, the power station-integrated solution according to the invention also allows a noticeably improved level of efficiency to be expected.

According to a first embodiment of the present invention, it is provided that the air from the first air flow, which supplies the high-temperature battery, has a temperature level of at least 250° C., preferably of at least 300° C., during normal operation of the burner device. As a result, it can be ensured, for example, that a sodium-sulfur cell, which typically requires operating temperatures of 250° C. to 300° C., can be advantageously operated. In particular, additional heating devices are no longer necessary for the required achieving of the operating temperature of a sodium-sulfur cell. This consequently allows a reduction of the cost with regard to necessary heating devices during the provision and also during the operation of these. Since as a result of the integration of the high-temperature battery into the steam power station the thermal power losses can also be comparatively minimized, the integration solution according to the embodiment proves to be especially advantageous.

According to a further embodiment, it is provided that the air from the first air flow, with which the high-temperature battery is supplied, is fed to a coal mill after thermal interaction with the high-temperature battery, especially after a thermal and/or chemical interaction. According to the embodiment, suitable feeding means are provided for this. The interaction is typically carried out in this case inside the high-temperature battery, wherein the air is then fed to the coal mill. The thermal energy from the air serves in this case especially for drying or for inertizing the coal dust. In addition, the air can also be provided for transporting the coal dust from the coal mill to the combustion chamber in a suitable manner. Depending on the operating state of the high-temperature battery, a different quantity of thermal energy can be added to or even removed from the air so that temperature fluctuations can occur during the feed into the coal mill.

If, for example, the metal-air battery described above is supplied with air from the first air flow during the discharging state, then the energy content of the air is increased even further on account of the exothermic reactions which take place in the metal-air battery. The air, therefore, after discharging from the high-temperature battery, can have a higher temperature in comparison to the time point of entry into this. The situation can be different, however, if the high-temperature battery primarily absorbs thermal energy approximately at a time point of the charging state, and as a result reduces the energy content of the air. A slight change of the temperature is also to be expected if the high-temperature battery in a standby state is neither charged nor discharged.

If the air from the first air flow therefore serves primarily for supplying the high-temperature battery with thermal energy, then it can also fulfill the function of a transporting medium at the same time in order to carry away thermal energy from the high-temperature battery, for example. According to the embodiment, the air of the first air flow which is carried away from the high-temperature battery is fed to a coal mill so that the thermal energy which is absorbed therein can subsequently be utilized in a suitable manner. A particularly efficient utilization ensues especially when additional thermal energy can be carried away from the high-temperature battery by means of this air flow and fed to the coal mill.

According to a continuation of this embodiment, it can therefore be provided that the air after thermal interaction with the high-temperature battery in operation has a higher temperature level than before the thermal interaction with the high-temperature battery. As already explained above, such a higher temperature level can ensue especially in a discharging state of the metal-air battery which is described further above. According to a further embodiment, it can be provided that the air which is extracted from the high-temperature battery—which is fed to the coal mill—is adjusted with regard to its flow rate in an open-loop or closed-loop controlled manner in order to thereby design the heat input into the coal mill in an especially advantageous manner.

According to a further embodiment of the invention, it is conceivable that the coal mill is supplied with a second air flow which has a relatively lower temperature level than the first air flow. The first air flow and the second air flow are preferably intermixed before being fed into the coal mill. In this case, the intermixing is typically carried out in a suitable mixing chamber or alternatively in the coal mill itself if no mixing is provided before feeding into the coal mill. By the provision of two air flows at different temperature levels, the heat which is fed to the coal mill can be suitably adjusted. If, for example, thermal energy is to be increasingly fed to the coal mill then the partial flow of air from the first air flow would need to be proportionally increased. By the same token, the part of the air from the second air flow would need to be correspondingly increased if a relatively smaller heat quantity is to be fed to the coal mill. By suitable selection of the individual air flows, sufficient thermal energy can be fed to the coal mill. By the same token, with suitable adjustment the flow rates can be advantageously established.

According to a continuation of this aspect, it can be provided that provision is made for a fluidic control which ensures that the temperature inside the coal mill fluctuates not more than by 50° C., preferably not more than by 20° C., after the mixing of the air from the first air flow and air from the second air flow. In the case of such a fluctuation range, the processing of the coal dust in the coal mill can be carried out in an especially uniform manner, as a result of which a more uniform combustion temperature is also to be expected in the meantime during combustion of the coal dust.

According to an embodiment of the present invention, it is provided that the second air flow, before being fed to the coal mill, is conditioned by means of a heat exchanger, especially a steam-operated air preheater. The heat exchanger is especially suitable in this case for feeding sufficient thermal energy to the second air flow so that this has a temperature level which, after mixing with air from the first air flow, has an overall temperature level which is suitable for operating the coal mill. By the provision of thermal energy by means of the heat exchanger, the differences of the temperature level between air from the first air flow and air from the second air flow are particularly advantageously compensated so that smaller fluctuations are to be expected after the mixing of the two air flows.

According to a continuing aspect of this embodiment, it is provided that the heat exchanger is designed for thermally conditioning, especially preheating, the air which is fed to the air preheater as first air flow and subsequently fed to the combustion chamber as combustion air. As a result, not only the thermal energy content of the air of the first air flow is increased but also the thermal overall efficiency of the steam power station is improved.

According to a further advantageous embodiment of the steam power station, it is provided that the air from the first air flow for the supply of the high-temperature battery is initially fed to the high-temperature battery and after interaction with this, especially after thermal and/or chemical interaction with this, is fed to the combustion chamber as combustion air. Consequently, the thermal energy, which has been made available to the high-temperature battery, is no longer made available to the combustion air. On the other hand, with suitable operation of the high-temperature battery a heat input into the air of the first air flow is also carried out, however, so that the combustion air has a higher thermal energy content. Consequently, the air from the first air flow would have a higher temperature level when being introduced into the combustion chamber. This increased thermal energy content can also result in improved combustion efficiency. Since, however, the high-temperature battery, depending on operating state, can extract different quantities of thermal energy from the air of the first air flow, or feed different quantities of thermal energy to this, and since therefore the temperature level of the air fluctuates, particular attention is to be paid to the suitable thermal processing of the combustion air. Also conceivable in this case for example, as in the previously described embodiments, is a mixing with a further air flow which is merged with the air from the first air flow in a way that the fluctuations of the temperature level of the combustion air which is fed to the combustion chamber are advantageously adjusted.

According to a further embodiment of the steam power station according to the invention, it is provided that the high-temperature battery is a metal-air battery which especially consumes air oxygen during a discharging operation by chemical reduction. Consequently, the air from the first air flow would not only serve for providing thermal energy for the high-temperature battery but at the same time would also serve as process gas which in the course of the operating states of the metal-air battery could be altered with regard to its composition. Consequently, the air of the first air flow could fulfill two advantageous functions.

According to a further embodiment, it is provided that the high-temperature battery is designed for being supplied with steam which has been thermally processed by means of the combustion heat in the combustion chamber. Especially in the case in which the high-temperature battery is designed as a metal-air battery, the steam can additionally also serve for providing an oxidizing agent for oxidation of metallic storage materials, for example metallic iron or low-order iron oxide. The water in this case would itself be reduced in the course of this oxidation, forming hydrogen. In order to supply the metal-air battery with additional thermal energy, the steam can be at a higher temperature level in comparison to the temperature level of the first from the first air flow. Thus, it is conceivable, for example, that steam is extracted from the steam process at temperatures of more than 300° C., especially of more than 500° C., in order to be fed to the metal-air battery. According to the embodiment, the high-temperature battery could therefore be supplied by means of additional thermal energy, which on one hand can increase the operating efficiency of the high-temperature battery and on the other hand can improve the overall efficiency of the steam power station.

According to an embodiment of the method according to the invention, it can be provided that the supplying of the high-temperature battery with air from the first air flow is carried out in an open-loop or closed-loop controlled manner as a function of the operating state of the high-temperature battery. Therefore, by means of suitable sensing means, for example, the operating state of the high-temperature battery can be detected, and following this, by means of suitable open-loop or closed-loop control means a suitable open-loop or closed-loop control of the air quantity from the first air flow can be carried out. If the high-temperature battery is, for example, in a charging state and requires a relatively higher input of thermal energy, the air flow which is fed to the high-temperature battery could be increased, for example. On the other hand, it is conceivable that the air flow, and therefore the quantity of thermal energy, is reduced if the high-temperature battery is, for example, in a charging state and generates thermal energy itself on account of an electrochemical reaction.

The invention shall be explained below by way of example with reference to figures. In this case, the figures are not be judged to be limiting with regard to the general subject matter of the invention. Also, the figures are deemed to be purely schematic in order to maintain the clarity and to improve the comprehensibility. It is up to the person skilled in the art to substantiate the schematic arrangements which are represented in the figures.

BRIEF DESCRIPTION OF THE DRAWINGS

Subsequently in the figures in this case:

FIG. 3 shows a third embodiment of the steam power station according to the invention in a schematic view of connections.

DETAILED DESCRIPTION OF INVENTION

Figure 1:
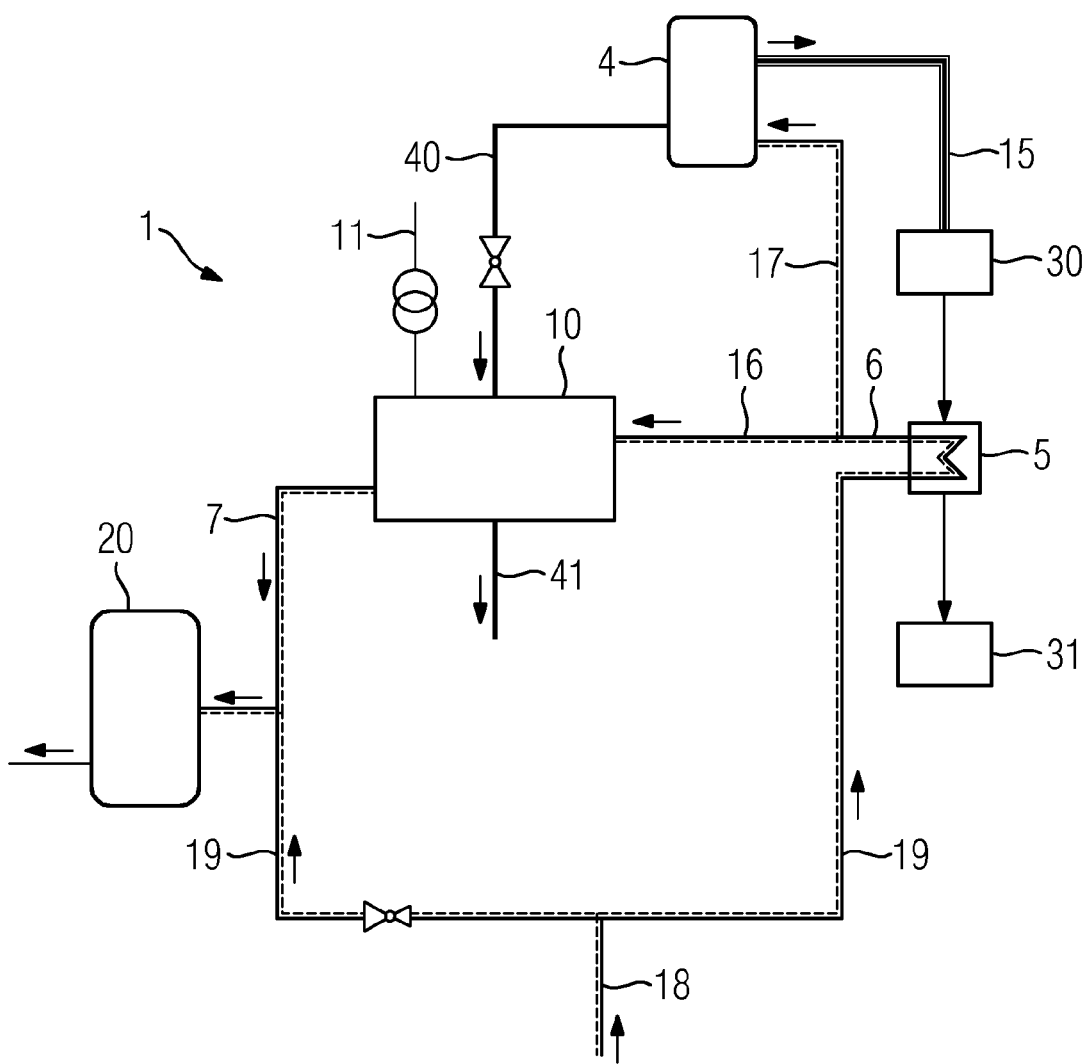
FIG. 1 shows a first embodiment of the steam power station according to the invention in a schematic view of connections.

FIG. 1 shows a first embodiment of the steam power station according to aspects of the invention in a schematic view of connections. In this case, the steam power station 1 comprises a combustion chamber 4 with a burner device which is not further identified and shown. During operation of the burner device, flue gas is created in the combustion chamber 4 with a high thermal energy content. The flue gas is fed, for example, to a denitrating plant 30 by means of a suitable flue gas line. In order to make the thermal energy content of the flue gas usable for further processes during operation of the steam power station, some of the thermal energy is transferred to the air of a first air flow 6 by means of a regenerative air preheater 5 in the sense of a heat exchanger. After release of the thermal energy, the flue gas can, for example, be further processed in a particle separator 31 in order to be released later into the environment.

The air of the first air flow 6 can, for example, be extracted from a fresh air feed line 18. The fresh air is conditioned as a result of the transfer of thermal energy by means of the air preheater 5 with regard to its heat quantity. The temperature level of this thus-conditioned quantity of air is significantly increased so that a temperature of at least 250° C., preferably of at least 300° C., is made available in the first air flow 6. One part of the first air flow 6 is fed as secondary air via a suitable secondary air feed line 17 to the combustion chamber again as thermally conditioned combustion air. Another part of the first air flow 6 is fed as primary air by means of a suitable primary air feed line 16 to a high-temperature battery 10. The thermal energy which is inherent to the primary air can in this case be transferred to the high-temperature battery 10 as a result of interaction. Depending on the operating state of this high-temperature battery 10, it can also be possible that additional thermal energy is transferred to the primary air after thermal interaction with the high-temperature battery 10 itself. After interaction with high-temperature battery 10 has been carried out, the primary air is fed to a coal mill 20 in order to enable the coal dust processing. Drying or inertizing of the coal dust is especially carried out by means of the air feed.

In this case, fresh air from a fresh air feed line 18 is divided into two different air flows, wherein one is provided for absorbing additional thermal energy from the regenerative air preheater 5, whereas the other air flow is provided for feeding to the coal mill 20. In order to be able to adjust the quantity of the air which is fed to the coal mill 20, or to adjust the quantity of heat contained therein, in a suitable manner, suitable closed-loop or open-loop control means, preferably valves, can be provided, as shown in FIG. 1. These are introduced into the air feed line 19 in a suitable manner.

The featured embodiment provides that the coal mill 20 is supplied by means of two independent air flows which are intermixed before being fed into the coal mill 20. One of them is the air flow 7 which discharges from the high-temperature battery 10. The other air flow is the partial flow which was separated from the fresh air flow of the fresh air feed line 18. In this case, both air flows typically have a different thermal energy content. Especially when the air flow 7 which is extracted from the high-temperature battery 10 fluctuates in its energy content on account of different operating states of the high-temperature battery 10 itself, such fluctuation differences can be compensated in a suitable manner by means of the air flow which is extracted from the air feed line 19. By means of suitable closed-loop or open-loop control of the two air flows with regard to each other, the fluctuation range of the overall thermal energy which is introduced into the coal mill 20 can thereby be kept relatively small.

During discharging of the high-temperature battery 10, electric energy can be made available to an electricity network feed line 11. On the other hand, it is necessary in a charging state of the high-temperature battery 10 that electric energy is made available to the high-temperature battery 10 via a feed line, which is not additionally shown.

If, as in the present embodiment, the high-temperature battery 10 is a metal-air battery, which is described further above, then this can also be provided with steam via a steam feed line 40. According to the present representation, prepared steam is extracted in the combustion chamber 4. In order to be able to suitably adjust the quantity of steam which is made available to the high-temperature battery 10, suitable open-loop or closed-loop control means, especially valves, can be provided in the steam feed line 40, as schematically shown. If the steam in the high-temperature battery 10 is no longer additionally required, or this is to be exchanged, this can extracted from the high-temperature battery 10 by means of a steam discharge line 41.

As is made clear from the schematic representation in FIG. 1, the provision of the high-temperature battery 10 which is integrated into the steam power station enables a suitable supplying of this with thermal energy from the flue gas of the flue gas line 15. On account of the local proximity of combustion chamber 4 and high-temperature battery 10, the thermal losses when providing thermal energy by means of air from the first air flow 6 are advantageously low. As a result of the integration of the high-temperature battery 10 into the steam power station, a very advantageous increase of the overall efficiency of the steam power station can especially be achieved.

Figure 2:
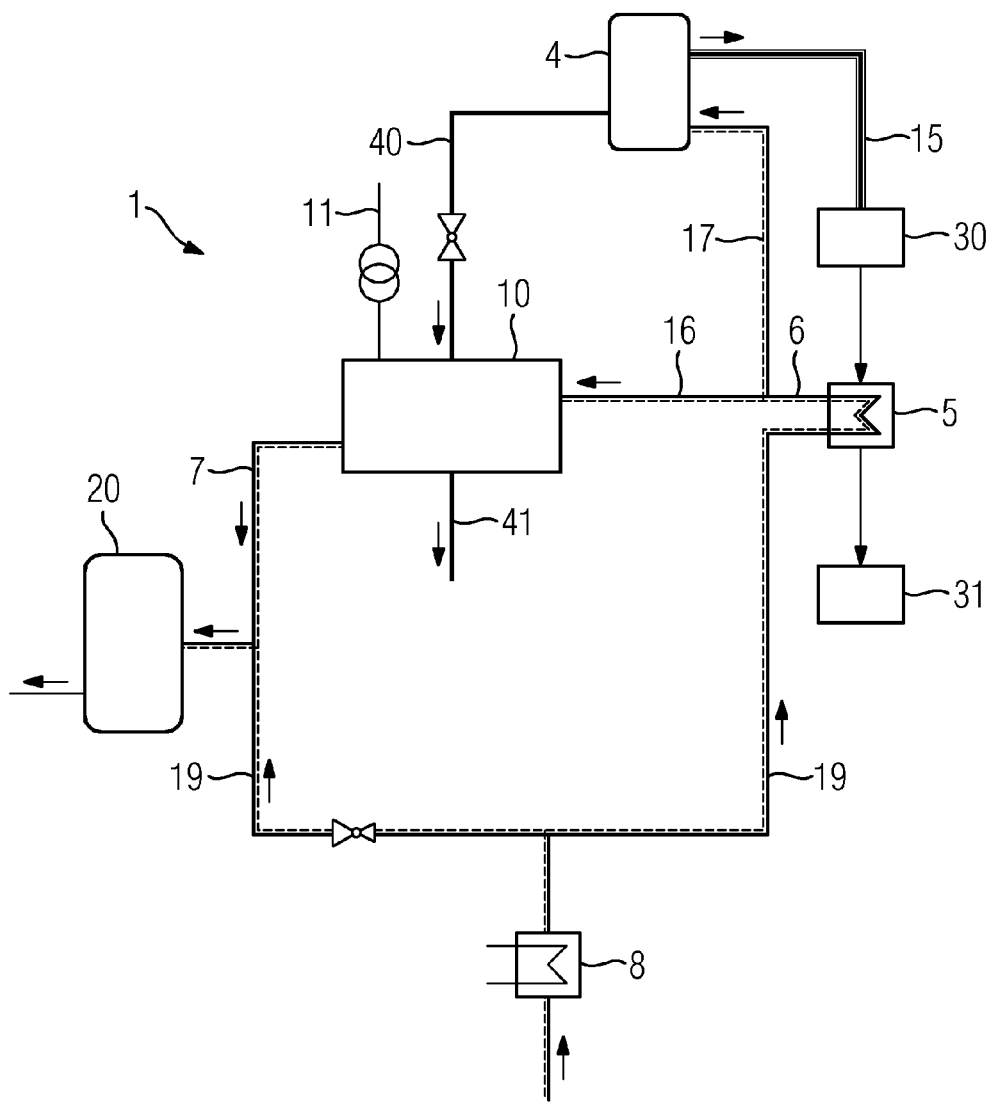
FIG. 2 shows a second embodiment of the steam power station according to the invention in a schematic view of connections.

FIG. 2 shows a further embodiment of the steam power station according to the invention in a schematic representation. In comparison to the representation shown in FIG. 1, the embodiment shown in FIG. 2 only differs to the effect that the heat transfer by means of the regenerative air preheater 5 is carried out not to unconditioned fresh air from a fresh air feed line 18 but to air which is already thermally conditioned. According to the embodiment, the air has already obtained a heat input in a heat exchanger 8, especially preferably in a steam-operated air preheater 8, for thermal conditioning. According to the embodiment, the heat transfer can be carried out to fresh air.

FIG. 3 shows a further embodiment of the steam power station according to the invention in a schematic view of connections. The embodiment shown in FIG. 3 differs with regard to the embodiment of the invention shown in FIG. 1 to the effect that not primary air from a primary air feed line 16 is fed to the high-temperature battery 10 but secondary air from the secondary air feed line 17. According to this embodiment, the high-temperature battery 10 is therefore connected in the secondary air feed line 17 upstream of the combustion chamber 4. As a result, the entire thermal content of the primary air from the primary air feed line 16 is indeed available to the coal dust processing in the coal mill 20, but now the thermal energy for operation of the high-temperature battery 10 is extracted from the secondary air in the secondary air feed line 17. This can have advantages during operation of the high-temperature battery insofar as the heat which is generated by the operation of the high-temperature battery 10 can additionally be made available to the combustion air.

The features which are claimed in the exemplarily depicted embodiments of the invention according to FIG. 1 to FIG. 3 are to be claimed individually as well as in their entirety together with the other depicted features.

Further embodiments come from the dependent claims.

The invention claimed is:

1. A steam power station, comprising
a steam boiler, which is fired by a burner device in a combustion chamber, and also an air preheater which is suitable for extracting thermal energy from the flue gas of the combustion chamber in order to transfer it to a first air flow, which first air flow is fed again in part to the combustion chamber as combustion air, and
a high-temperature battery which is also supplied with air from the first air flow.

2. The steam power station as claimed in claim 1, wherein the air from the first air flow, which supplies the high-temperature battery, has a temperature level of at least 250° C. during normal operation of the burner device.

3. The steam power station as claimed in claim 1, wherein the air from the first air flow, with which the high-temperature battery is supplied, is fed to a coal mill after thermal interaction with the high-temperature battery.

4. The steam power station as claimed in claim 3, wherein the coal mill is supplied with a second air flow which has a relatively lower temperature level than the first air flow.

5. The steam power station as claimed in claim 4, wherein the first air flow and the second air flow are intermixed before being fed into the coal mill.

6. The steam power station as claimed in claim 3, further comprising
a fluidic control which ensures that the temperature inside the coal mill fluctuates not more than by 50° C. after the mixing of the first air flow and the second air flow.

7. The steam power station as claimed in claim 3, further comprising
a heat exchanger wherein the second air flow is conditioned before being fed to the coal mill.

8. The steam power station as claimed in claim 7, wherein the heat exchanger is designed for thermally conditioning the air, which is fed to the air preheater as the first air flow and subsequently fed to the combustion chamber as combustion air.

9. The steam power station as claimed in claim 1, wherein the air from the first air flow for the supply of the high-temperature battery is initially fed to the high-temperature battery and after interaction is fed to the combustion chamber as combustion air.

10. The steam power station as claimed in claim 1, wherein
the high-temperature battery is a metal-air battery which consumes air oxygen by reduction during a discharging operation.

11. The steam power station as claimed in claim 1, wherein
the high-temperature battery is designed for being supplied with steam which has been thermally processed by the combustion heat in the combustion chamber.

12. A method for operating a steam power station as claimed in claim 1, comprising
supplying the high-temperature battery in an operating state with air from the first air flow.

13. The method as claimed in claim 12, wherein
the supplying of the high-temperature battery with air from the first air flow is carried out in an open-loop or closed-loop controlled manner as a function of the operating state of the high-temperature battery.

14. The steam power station as claimed in claim 1, wherein
the air from the first air flow, which supplies the high-temperature battery, has a temperature level of at least 300° C., during normal operation of the burner device.

15. The steam power station as claimed in claim 1, wherein
the air from the first air flow, with which the high-temperature battery is supplied, is fed to a coal mill after a thermal and/or chemical interaction with the high-temperature battery.

16. The steam power station as claimed in claim 3, further comprising
a fluidic control which ensures that the temperature inside the coal mill fluctuates not more than by 20° C. after the mixing of the first air flow and the second air flow.

17. The steam power station as claimed in claim 3, wherein
the second air flow is conditioned by a steam-operated air preheater before being fed to the coal mill.

18. The steam power station as claimed in claim 7, wherein
the heat exchanger is designed for preheating the air, which is fed to the air preheater as the first air flow and subsequently fed to the combustion chamber as combustion air.

19. The steam power station as claimed in claim 1, wherein
the air from the first air flow for the supply of the high-temperature battery is initially fed to the high-temperature battery and, after thermal and/or chemical interaction, is fed to the combustion chamber as combustion air.

* * * * *